United States Patent
Nati et al.

(10) Patent No.: US 8,537,459 B2
(45) Date of Patent: Sep. 17, 2013

(54) METHOD AND APPARATUS FOR CONTROLLING AND PROTECTING PULSED HIGH POWER FIBER AMPLIFIER SYSTEMS

(75) Inventors: Salvatore F. Nati, Dexter, MI (US); Otho E. Ulrich, Jr., Ann Arbor, MI (US); Gyu Cheon Cho, Ann Arbor, MI (US); Wayne A. Gillis, Ann Arbor, MI (US); Donald J. Harter, Ann Arbor, MI (US); Mark Bendett, Kirkland, WA (US); Ingmar Hartl, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 13/459,935

(22) Filed: Apr. 30, 2012

(65) Prior Publication Data
US 2012/0212803 A1     Aug. 23, 2012

Related U.S. Application Data

(60) Continuation of application No. 12/619,262, filed on Nov. 16, 2009, now abandoned, which is a division of application No. 12/181,390, filed on Jul. 29, 2008, now Pat. No. 7,626,758, which is a continuation of application No. 10/813,173, filed on Mar. 31, 2004, now Pat. No. 7,505,196.

(51) Int. Cl.
*H01S 3/00*     (2006.01)

(52) U.S. Cl.
USPC .................................... 359/341.4; 359/333

(58) Field of Classification Search
USPC ................................................ 359/341.4, 333
See application file for complete search history.

(56) References Cited

U.S. PATENT DOCUMENTS

| | | | |
|---|---|---|---|
| 5,128,601 A | | 7/1992 | Orbach et al. |
| 5,142,408 A | * | 8/1992 | Marshall et al. .............. 359/344 |

(Continued)

FOREIGN PATENT DOCUMENTS

| | | |
|---|---|---|
| DE | 10124983 A1 | 3/2002 |
| JP | H01-104486 A | 4/1989 |

(Continued)

OTHER PUBLICATIONS

Milton Ohring, "Reliability and Failure of Electronic Materials and Devices", Academic Pres, New York, 1998, pp. 550-552.

(Continued)

*Primary Examiner* — Mark Hellner
(74) *Attorney, Agent, or Firm* — Sughrue Mion, PLLC

(57) ABSTRACT

An electronic circuit for controlling a laser system consisting of a pulse source and high power fiber amplifier is disclosed. The circuit is used to control the gain of the high power fiber amplifier system so that the amplified output pulses have predetermined pulse energy as the pulse width and repetition rate of the oscillator are varied. This includes keeping the pulse energy constant when the pulse train is turned on. The circuitry is also used to control the temperature of the high power fiber amplifier pump diode such that the wavelength of the pump diode is held at the optimum absorption wavelength of the fiber amplifier as the diode current is varied. The circuitry also provides a means of protecting the high power fiber amplifier from damage due to a loss of signal from the pulse source or from a pulse-source signal of insufficient injection energy.

28 Claims, 8 Drawing Sheets

(56) References Cited

U.S. PATENT DOCUMENTS

| | | |
|---|---|---|
| 5,226,051 A | 7/1993 | Chan et al. |
| 5,397,933 A | 3/1995 | Yamada |
| 5,400,351 A | 3/1995 | Montgomery et al. |
| 5,440,573 A | 8/1995 | Fermann |
| 5,450,427 A | 9/1995 | Fermann |
| 5,579,328 A | 11/1996 | Habel et al. |
| 5,812,569 A | 9/1998 | Walker et al. |
| 5,867,305 A | 2/1999 | Waarts et al. |
| 5,880,877 A | 3/1999 | Fermann |
| 5,933,271 A | 8/1999 | Waarts et al. |
| 5,978,393 A | 11/1999 | Feldman et al. |
| 6,072,811 A | 6/2000 | Fermann |
| 6,097,741 A | 8/2000 | Lin |
| 6,104,526 A | 8/2000 | Kakui |
| 6,151,338 A | 11/2000 | Grubb |
| 6,208,458 B1 | 3/2001 | Galvanauskas et al. |
| 6,335,941 B1 | 1/2002 | Grubb et al. |
| 6,339,604 B1 | 1/2002 | Smart |
| 6,347,007 B1 | 2/2002 | Grubb et al. |
| 6,373,867 B1 | 4/2002 | Lin |
| 6,393,035 B1 | 5/2002 | Weingarten et al. |
| 6,411,430 B1 | 6/2002 | Ogino |
| 6,424,663 B1 | 7/2002 | Fidric et al. |
| 6,433,306 B1 | 8/2002 | Grubb et al. |
| 6,546,169 B1 | 4/2003 | Lin |
| 6,560,268 B1 | 5/2003 | Deichsel |
| 6,567,438 B2 | 5/2003 | Lin |
| 6,570,892 B1 | 5/2003 | Lin |
| 6,590,910 B2 | 7/2003 | Lin |
| 6,643,299 B1 | 11/2003 | Lin |
| 6,693,927 B1 | 2/2004 | Horvath |
| 6,813,429 B2 | 11/2004 | Price |
| 6,816,652 B1 | 11/2004 | Lin |
| 6,839,363 B2 | 1/2005 | Lin |
| 6,845,108 B1 | 1/2005 | Liu |
| 6,885,683 B1 | 4/2005 | Fermann |
| 6,901,085 B2 | 5/2005 | Hu |
| 6,917,631 B2 | 7/2005 | Richardson et al. |
| 6,958,856 B2 | 10/2005 | Inoue et al. |
| 6,996,144 B2 | 2/2006 | Tayebati |
| 7,088,756 B2 | 8/2006 | Fermann |
| 7,414,780 B2 | 8/2008 | Fermann |
| 7,573,918 B1 | 8/2009 | Soh et al. |
| 7,580,432 B2 | 8/2009 | Sucha |
| 7,602,825 B1 | 10/2009 | Lin et al. |
| 7,668,213 B2 | 2/2010 | Hoffman et al. |
| 7,991,022 B1 | 8/2011 | Soh et al. |
| 2004/0017603 A1* | 1/2004 | Jay et al. ............... 359/341.4 |
| 2005/0092720 A1 | 5/2005 | Gu et al. |
| 2005/0226278 A1 | 10/2005 | Gu et al. |
| 2005/0226286 A1 | 10/2005 | Liu et al. |
| 2005/0226287 A1 | 10/2005 | Shah et al. |
| 2009/0097514 A1 | 4/2009 | Shah et al. |
| 2010/0060978 A1 | 3/2010 | Nati et al. |
| 2010/0188736 A1 | 7/2010 | Liu et al. |
| 2011/0139760 A1 | 6/2011 | Shah et al. |
| 2012/0008649 A1 | 1/2012 | Gu et al. |
| 2013/0003065 A1 | 1/2013 | Shah et al. |

FOREIGN PATENT DOCUMENTS

| | | |
|---|---|---|
| JP | 2002118315 A | 4/2002 |
| JP | 2004/022795 A2 | 1/2004 |
| WO | 8808216 A1 | 10/1988 |
| WO | 01/20398 A1 | 3/2001 |

OTHER PUBLICATIONS

JP2007-506209—English translation of Notice of Office Action issued by Japan Patent Office on May 10, 2011.

Lim et al., "Generation of 2-nJ pulses from a femtosecond ytterbium fiber laser." Optical Soc. of America, Optics Letters, vol. 28 (8), 660-662 Apr. 15, 2003.

Lefort et al., "Practical low-noise stretched-pulse Yb-doped fiber laser." Optics Letters, 27(5), 291-293, Mar. 1, 2003.

Ilday et al., "Generation of 50-fs, 5-nJ pulses at 1.03 mm from a wave-breaking-free fiber laser." Optics Letters, 28(15), 1365-1367, Aug. 1, 2003.

Okhotnikov, et al, "980-nm picosecond fiber laser." IEEE Photonics Technology Letter, vol. 15, No. 11, Nov. 2003, pp. 1519-1521.

\* cited by examiner a. Continuous Seed Pulse Sequence b. Step-Function Seed Pulse Gate c. Selected Seed Pulses d. Effective Amplifier Gain e. Non-uniform Amplified Output Pulses Time → a. Continuous Seed Pulse Sequence b. Ramp-Function Seed Pulse Gate c. Selected Seed Pulses d. Amplifier Gain e. Uniform Amplified Output Pulses Time → a. Dense Seed Pulse Sequence b. Seed Pulse Selector and Attenuator c. Selected Seed Pulses d. Effective Amplifier Gain e. Uniform Amplified Output Pulses Time →

METHOD AND APPARATUS FOR CONTROLLING AND PROTECTING PULSED HIGH POWER FIBER AMPLIFIER SYSTEMS

CROSS-REFERENCE TO RELATED APPLICATIONS

This application is a Continuation of U.S. application Ser. No. 12/619,262 filed Nov. 16, 2009, which is a Divisional of U.S. application Ser. No. 12/181,390 filed Jul. 29, 2008, now issued U.S. Pat. No. 7,626,758, Dec. 1, 2009, which is a Continuation of U.S. application Ser. No. 10/813,173 filed Mar. 31, 2004, now issued U.S. Pat. No. 7,505,196, Mar. 17, 2009. The above-noted applications are incorporated herein by reference in their entirety.

FIELD OF THE INVENTION

This invention relates generally to a pulsed laser system comprising a high power fiber amplifier and a pulsed seed source. One embodiment in accordance with the invention uses an electronically controlled semiconductor diode laser as the seed source. The seed source may also be a mode-locked laser.

BACKGROUND OF THE INVENTION

Pulse laser systems consisting of an oscillator and a high power fiber amplifier have been developed and are well known in the art. See, for example, U.S. Pat. Nos. 6,208,458; 6,181,463; and 5,696,782, all of which are assigned to the same assignee as the present invention and all of which are included herein by reference for all that they teach. Conventional systems of this type typically operate at a fixed pulse width and repetition rate. However, systems with variable pulse widths and repetition rates have also been developed. For example, see U.S. Pat. Nos. 6,347,007; 6,335,941; and 6,433,306 to Grubb et al. For certain applications, it is desired that the output pulse energy of these types of systems be maintained at a constant value as the pulse width and repetition rate of the pulse source is varied.

The gain of the amplifier system depends on the rate at which energy is stored into, and depleted from, the doped fiber. Therefore, output pulse energy varies as a function of the rate of energy storage into the amplifier and the repetition rate of the seed, which extracts energy from the amplifier. A known method includes adjusting the gain of the amplifier by adjusting the power of the amplifier pump diode by changing its drive current as a function of the seed source pulse energy and repetition rate. A further alternative, which is suitable under some conditions, includes changing the pulse energy of the seed source by modulating the source directly or attenuating its input to the power amplifier.

The gain of the fiber amplifiers in these systems is a function of the wavelength of the pump diode as well as a function of the pump diode power. The optimum pump diode wavelength is a function of the material properties of the amplifier fiber. For example, in a Yb amplifier system, the optimum pump wavelength is approximately 976 nm for the shortest amplifier length. Further, the wavelength of the pump diode is a function of diode temperature. In most practical systems, and particularly in systems using amplifier pump diodes containing multiple diodes packaged in a single package, the actual diode temperature and emission wavelength will vary as a function of diode current, even if the package is nominally held at a constant temperature. This is so because the temperature sensor used to monitor the diode temperature is located a short distance from the actual diode. Therefore, to obtain further control over the output pulse energy it is necessary to counter wavelength drift of the pump diode by a more accurate and actively controlled mechanism.

Also influencing the gain of the fiber is the temperature of the fiber. One physical process for changing this gain is made possible because rare earth ions, such as Yb and Er, are actually quasi three-level lasing materials rather than four-level lasing materials. This means that at the lasing wavelength there is some absorption. The amount of absorption is determined by the Boltzman distribution of states, which is temperature dependent.

U.S. Pat. Nos. 5,867,305 and 5,933,271 to Waarts et al. disclose pulsing the pump laser diodes for the purpose of preventing the buildup of amplified noise between two fiber amplifiers for amplifying pulses. An improvement to these systems is to avoid the need for a gate synchronized to the seed pulse. However, the build-up time of amplified noise in such a system is the round-trip time of the total fiber amplifier length which is 10-100 ns and not the fluorescence lifetime which is 400 µsec to 10 msec as stated in the two references mentioned above. Under most conditions sufficient gain cannot be obtained in a fiber amplifier when the pump laser diode is pulsed for 10-100 ns.

SUMMARY OF THE INVENTION

It is an object of the present invention to provide a high power fiber amplifier system with means for controlling the pump diode current and the gain of the fiber amplifier such that the output pulse energy is constant as the pulse width and repetition rate are adjusted during operation. This includes keeping the pulse energy constant during turn-on of the pulse train.

It is a further object of the invention to provide means for controlling the temperature of the fiber amplifier pump diode such that the pump diode wavelength is maintained at a fixed value with changes in diode current.

It is also an object of the invention to provide means for protecting the high power amplifier from damage due to gain buildup in excess of the damage threshold of the amplifier by monitoring the repetition rate of the injected oscillator pulses or external signal, and shutting off or reducing the pump diode current if the repetition rate falls below this threshold.

It is also an object of the invention to provide for monitoring of the amplitude of the seed pulses and to protect the high power fiber amplifier from damage by shutting off the pump diode if the amplitude of the injected pulses falls outside a safe threshold. It is also an object of the invention to provide a high power amplifier system with means for controlling the amplitude of the seed pulse such that the output energy of the power amplifier is constant.

The above and other objects of the invention are met by providing a device and method for controlling the diode current of the pump diode in a high power fiber amplifier, the device comprising a means for setting the pump diode current or power, monitoring such current or power, and maintaining the diode current or power at a constant value. Typically the current of the diode is controlled to correct for long term decrease on its output due to aging. In contrast, in accordance with an embodiment of the present invention, the pump diode current is controlled to dynamically control the gain of the power amplifier to maintain uniform pulse energy as the repetition rate and the pulse temporal width is changed. This includes turning the pump diode on sufficiently in advance and ramping up the current to produce equal power for the first pulses when the unit is turned on.

The device also provides a means for calculating and/or storing the desired pump diode current setting as a function of system pulse width and repetition rate, such that the energy of the output pulse is maintained at a desired value as the pulse width and repetition rate are varied.

A device in accordance with an embodiment of the invention also provides a means for calculating and storing the appropriate pump diode temperature setting as a function of the pump diode current setting, such that the emission wavelength of the pump diode is maintained at a wavelength that provides maximum absorption of the pump diode energy by the fiber amplifier medium as the pump diode current is varied.

Means are also provided to monitor the repetition rate of the injected pulses into the amplifier system, to compare it to a predetermined minimum repetition rate, and if lower than this minimum repetition rate, to disable or reduce the current to the amplifier pump diode to prevent it from being damaged.

The exemplary device discussed above also provides a means for comparing the amplitude of the pulse being injected into the fiber amplifier with a predetermined minimum amplitude value and if lower than this predetermined minimum, a means to disable or reduce the current to the amplifier pump diode to prevent it from being damaged. A device in accordance with an embodiment of the invention also provides a means of selecting and attenuating the seed pulses such that the amplified output pulses are of uniform energy.

It is an even further object of the invention to monitor the repetition rate of the oscillator and to provide a means for calculating the required down counter divide ratio needed to obtain a lower repetition rate.

It is also an object of the invention to be able to output a fixed repetition rate even if the oscillator repetition rate varies from unit to unit or as a function of time and/or temperature.

It is also an object of the invention to synchronize the oscillator with an external reference signal. It is also an object of the invention to vary this external reference in frequency, and have the oscillator repetition rate vary accordingly.

It is an even further object of the invention to vary the external reference in frequency, and have the oscillator repetition rate vary accordingly, and also have the down counted repetition rate vary accordingly.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
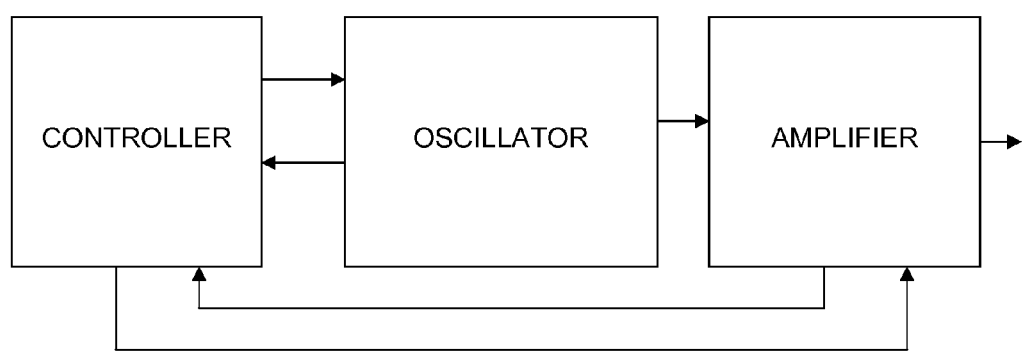
FIG. 1 is a basic block diagram representing an embodiment of the present invention.
Figure 8:
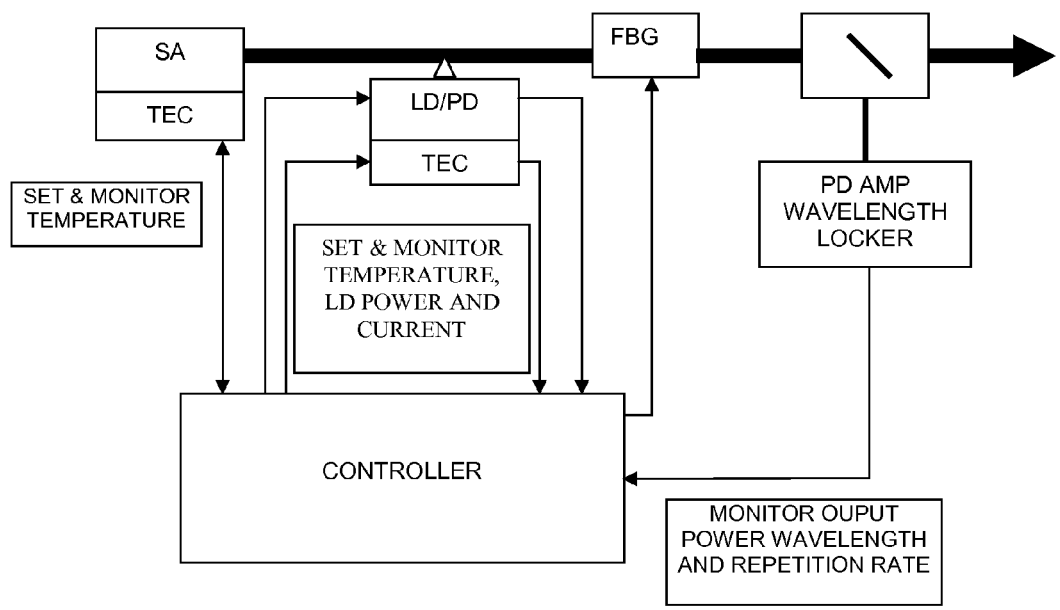
FIG. 8 is a block diagram of an oscillator in accordance with the present invention.

A general block diagram of the present invention is shown in FIG. 1. As shown, a system in accordance with the invention includes an oscillator, an amplifier and a controller. The controller has the ability to control and monitor various parameters of both the oscillator and amplifier. FIG. 8 illustrates an exemplary oscillator and its monitoring and control functions. The electric current, optical power and temperature of the oscillator pump diode can be monitored and controlled. This is accomplished by using a temperature sensor such as a thermistor to monitor the diode temperature and using a cooling device such as a thermoelectric cooler to adjust the diode temperature. The optical power of the laser diode is typically monitored using a back facet photodiode.

The temperature, current, wavelength, and repetition rate of the oscillator can be monitored and controlled. These properties are controlled to give better stability to the system. The wavelength variation of the oscillator can vary the output pulse width and pulse energy. The wavelength of the oscillator can be monitored at the output. The wavelength can then be adjusted by several means. The emission wavelength of the laser is monitored by a wavelength locker based on an etalon transfer function. The transmission of an etalon is measured with a detector and the photocurrent is compared with that from a reference detector. These elements are integrated in the locker package.

With the target wavelength set at a slope on the etalon transfer function, i.e., etalon transmission vs. wavelength curve, drift or shift of wavelength can be monitored by measuring the differential value of two photocurrents. Such a wavelocker is readily available with subnanometer accuracy, for example, at a wavelength of 1550 nm. For picosecond mode-locked fiber lasers, subnanometer wavelength stabilization is of potential importance because, for example, the spectral width of the time-bandwidth limited pulse is only 1 nm for a 1.6 ps pulse at 1060 nm.

The first device related to tuning and stabilization of the wavelength is the fiber Bragg grating (FBG). By changing the reflectance as a function of the wavelength, the cavity Q can be adjusted for a preferred wavelength. In a preferred embodiment of the invention, the temperature of the grating is varied with a thermo-electric cooler. The tuning range of a short period grating, with a typical grating section of a few millimeters, has a temperature coefficient of 10 pm/° C. resulting from mechanical expansion of the silica glass. By applying a polymer coating the coefficient can reach as high as 20 pm/° C. due to the higher expansion coefficient of the polymer. With a temperature variation of 50° C., wavelength tuning and stabilization within 1 nm is feasible. In another embodiment mechanical tension is applied by mounting the grating section on a Piezo expander.

A further embodiment of the tuning and stabilization element includes controlling the chip temperature of the saturable absorber in the cavity. The reflectance is a function of the bandgap of the absorber, which, in turn, depends strongly on the temperature of the semiconductor chip. By changing the temperature of the chip, the cavity Q is adjusted for a preferred wavelength. The temperature dependent bandgap shift in an InP-based semiconductor is in the range of 0.4 and 0.5 nm/° C. Thus a variation of +/−10° C. of the chip temperature with a thermo-electric cooler will provide sufficient wavelength coverage for stabilization of a picosecond pulse.

Another method for controlling the wavelength in accordance with the invention is to change the oscillator power by adjusting the current of the pump diode.

Figure 7:
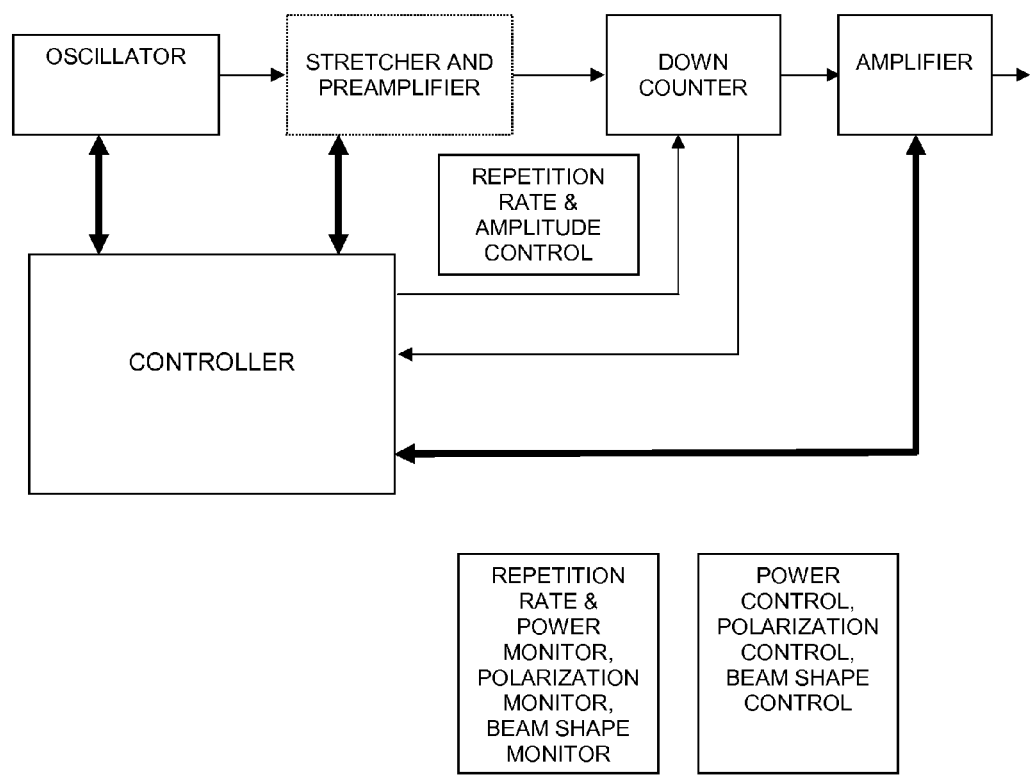
FIG. 7 is a block diagram demonstrating control of various optical and electrical parameters in accordance with an embodiment of the present invention.

The repetition rate of the oscillator is monitored by using an element, such as a photodiode and electronic amplifier, to convert the optical pulses into electrical signals. The electrical pulsed signals are then input to the controller where a repetition rate is calculated. FIG. 7 shows the monitoring and control functions that are incorporated into the amplifier portion of the system. Control of the amplifier pump diode is similar to that described above for the oscillator. Diode current and temperature can be monitored and adjusted to control the amplifier gain.

The repetition rate of the pulses injected into the amplifier is established by the controller, and can be a repetition rate that is the same or different than the oscillator repetition rate. Based on the repetition rate of the oscillator and the desired repetition rate at the output, the controller calculates the timing needed to open and close an optical shutter, also referred to as a down counter. This shutter may be an element such as an acousto-optic modulator (AOM). By electronically controlling the opening and closing of the shutter the repetition rate of the pulses injected into the amplifier are at the desired rate.

Laser systems relevant to the invention include master-oscillator, power-amplifiers (MOPAs) as shown in FIGS. 2a-2e. The master-oscillator (often called the "seeder" or pulse source) produces a pulse or pulse sequence at a relatively low power level that is delivered (indicated by the intervening arrow) to the power-amplifier, which increases the pulse energy. Generating the "seed" pulse or pulses at low power facilitates easier modification and manipulation of pulse parameters, such as, but not limited to, duration, temporal profile, central wavelength, and spectral bandwidth. The details of individual pulse parameters are not relevant to this invention and are mentioned here simply to suggest a rationale for selection of a MOPA configuration, except that maintaining the fidelity of the pulse throughout the MOPA is generally desirable.

Figure 2A:
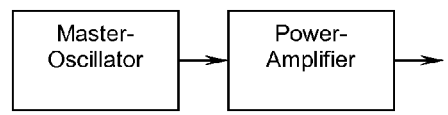
FIGS. 2a-2e are block diagrams of laser systems known as master-oscillator power amplifiers (MOPAs), in accordance with an embodiment of the present invention.
Figure 2B:
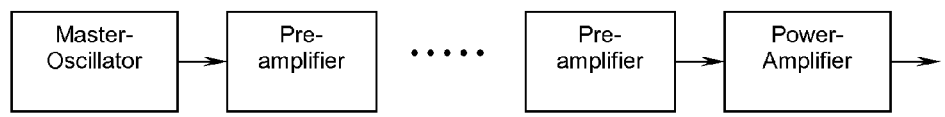

For this invention, it is preferred to use a seeder that produces a repetitive pulse sequence, although not necessarily a uniform sequence in time. In regard to this disclosure, often only a single stage of amplification after the seeder will be described, as shown in FIG. 2a; but such shall not be limiting. Often there are a number of amplifier stages situated between the seeder and final output of the laser system as depicted, for example, in FIG. 2b. The present invention applies at any stage of amplification, although a preferred embodiment places it immediately before the final amplifier.

Figure 2C:
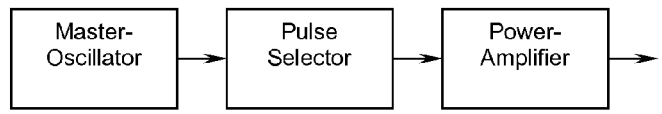

It is often desirable, and sometimes necessary, to operate the seeder continuously so that its output is temporally and energetically stable while retaining the means to extinguish the pulse output from the entire laser system. This is particularly true when the seeder is a passively mode-locked oscillator that operates at a relatively high repetition rate. In this case, the seeder operates at a higher repetition rate than is suitable for the ultimate application. A pulse selector, sometimes called a "down-counter", is used to select transmitted pulses. Providing a pulse selector at the final output is often untenable due a potential for damage to the device at the high power level existing at this location, or because the switching means distorts some important pulse characteristic. Also, a pulse selector at the output does not efficiently use the energy stored in the amplifier. In those cases where it is not feasible or desirable to place a pulse selector means (e.g., a switch) at the final output of the laser system, an intermediate pulse selector may be employed as shown in FIG. 2c.

Whereas MOPAs produce high pulse-to-pulse repeatability when operated in the steady state, such operation is not acceptable for many applications. For example, often an application requires that the laser output be stopped and started during a procedure or the repetition rate or pulse properties varied. Also, processes often require that the laser output be commanded to begin at a given pulse and that particular pulses be substantially equivalent to pulses produced during steady-state operation. In some systems, however, switching the pulse after the final power amplifier stage is untenable.

Figure 2D:
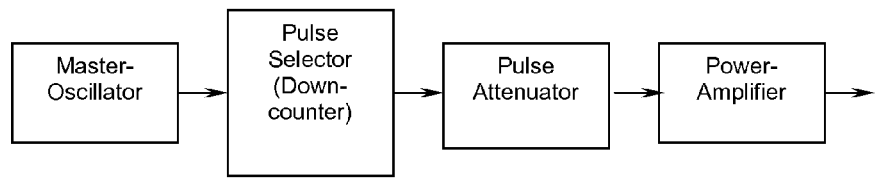
Figure 2E:
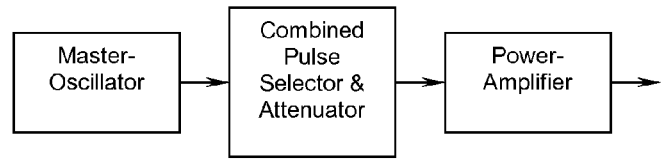

Initiating or changing the energy injection rate into a power amplifier generally has a detrimental transient affect upon the output pulse energy repeatability. The instant invention can selectively attenuate, i.e. reduce the amplitude of pulses, prior to injection into an amplifier stage to produce pulses at the output of the final amplifier that have uniform amplitude. Such an embodiment may contain an additional means for attenuating the input pulse, as shown in FIG. 2d, or a combined means as shown in FIG. 2e. This may be an element such as an acousto-optic modulator (AOM), a electro-optic modulator such as a lithium niobeate modulator or a electro-absorption modulator.

In order to maintain constant pulse energy it is necessary to consider the operational conditions of the amplifiers. The final amplifier, generally referred to as the power amplifier whereas earlier amplifier stages are referred to as "pre-amplifiers," is normally operated near saturation. Operating the final amplifier in saturation mode tends to maximize the system energy extraction efficiency since the majority of the system power budget is expended in the last stage. Operating an amplifier in saturation means that the pulse flux (i.e., power per unit area) is comparable to or exceeds the saturation flux, $I_{sat}$. The saturation flux is defined as that flux at which the effective gain is decreased to one-half the small-signal gain. The small-signal gain, $g_0$, is the gain in the limit of zero extraction flux and is a function of the extrinsic pump rate, and the intrinsic lasing medium properties, i.e., fluorescent lifetime, stimulated emission cross-section, state degeneracy, and lasant concentration.

A detailed description of the dynamics of a laser power amplifier subject to pulsed extraction requires knowledge of the pump rate, population inversion, parasitic losses, degeneracy of states, non-radiative transitions, quenching of terminal lasing levels, extraction flux, repetition rate, state lifetimes, as well as other parameters. However, a heuristic model can provide some insight into the motivation behind this invention. This model is particularly valid under conditions where the fluorescent lifetime of the laser is long compared to the pulse extraction period, and the pump rate is insufficient to restore the initial population between extraction pulses.

Figure 3:
FIG. 3a-3e represent uniform amplitude seed pulse inputs (3a) and their corresponding amplifier gain (3b-3d) which results in undesirable non-uniform output pulses from the power amplifier (3e).
Figure 3:
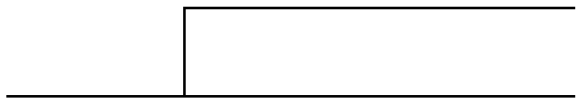
Figure 3:
Figure 3:
Figure 3:
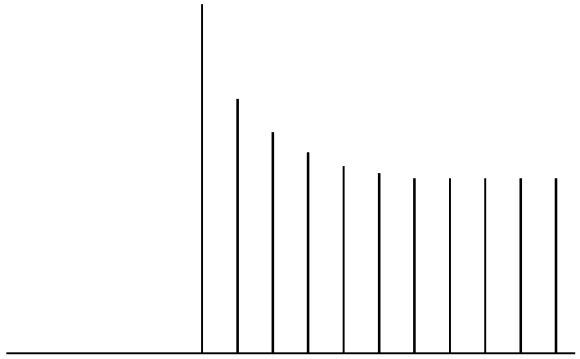

When oscillator pulses are not extracting energy from the amplifier, the gain will be at a maximum equivalent to the small-signal gain case, practically limited by the pump rate and parasitic losses. As pulse extraction proceeds faster than the pump can replenish the upper laser level, the effective (or saturated) gain decreases as, $g = g_0/(1 + I_{avg}/I_{sat})$, where $I_{avg}$ and $I_{sat}$, normally considered instantaneous quantities, are suitably integrated over times that are long compared to the pulse rate. As switched pulses from a free-running seeder, FIGS. 3a, b, & c, begin to extract energy from the saturable power amplifier, the effective gain will decrease over time as in FIG. 3d, and the pulse output will behave as shown in FIG. 3e. Such initially energetic pulses are unacceptable for many applications.

There are a number of ways to control the amplitude of the pulses from the amplifier such that the amplitude of the initial pulse is the same as the amplitude of the following pulses. The first way is to control the pulse selector shown in FIG. 2c, 2d or 2e. An exemplary pulse selector according to this embodiment is an optical switch. However, switches of many types are used in laser systems. The fastest mechanical shutters open in about one millisecond and, thereby, are applicable to laser systems with repetition rates no greater than 1 KHz. Moreover, mechanical shutters cannot be readily made to modulate the seeder, so they are of unlikely use here. Liquid crystal (LC) light valves can be modulated but are typically slower than mechanical switches, requiring a few milliseconds for opening. Furthermore, LC valves are susceptible to damage and can distort the pulse due to their intrinsic birefringence. Micro-electro-mechanical (MEMs) devices can switch rapidly, but have limitations for handling typical beam diameters of interest here.

As nearly all laser systems of interest have fluorescent lifetimes shorter than a few milliseconds, devices with switching times longer than a millisecond are of little value in this invention. Using presently available optical switching technology, electro-optic and acousto-optic devices are the best option for single pulse selection at repetition rates much faster than 1 KHz. The high voltage driver requirements of electro-optic cells and the intrinsic birefringence of electro-optic crystals generally eliminate these switches from consideration unless switching times under a few nanoseconds are required. Thus, an acousto-optic modulator (AOM) switch shall be considered the preferred embodiment of the invention, although such shall not be limiting.

The transmission of an AOM varies as the amplitude of the acoustic wave in its crystal. The acoustic wave causes the refractive index of the crystal to vary periodically, which diffracts the optical beam as a function of its period (i.e., angle of diffraction) and modulation depth (i.e., efficiency of diffraction). The acoustic wave is driven by a transducer attached to the crystal, which is, in turn, excited by a radio-frequency (RF) circuit. The amplitude of the RF signal used is readily controlled by an external input voltage. Thus, the output of the seeder can be effectively adjusted from a value near zero to a maximum pulse injection value into the power amplifier. The amplitude of the acoustic wave can be readily modulated with sub-microsecond resolution for crystals of suitable size and material using appropriate RF circuitry.

Figure 4:
FIG. 4a-4e represent attenuated seed pulse inputs (4a) and their corresponding amplifier gain (4b-4d) in accordance with an embodiment of the present invention, which result in desirable uniform output pulses from the power amplifier (4e).
Figure 4:
Figure 4:
Figure 4:
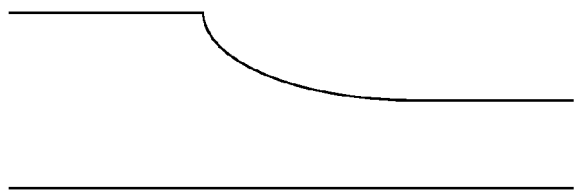
Figure 4:
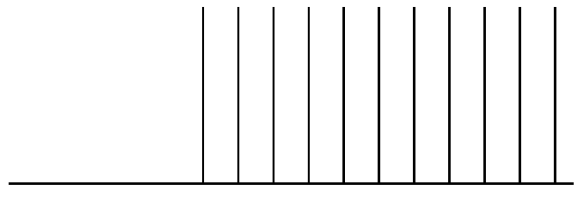
Figure 5:
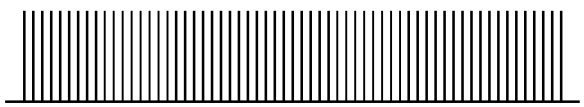
FIGS. 5a-5e represent combined selection and attenuation of seed pulse inputs (5a-5c) and their corresponding amplifier gain (5d) in accordance with an embodiment of the present invention, which results in "down-counted" uniform output pulses from the power amplifier (5e).
Figure 5:
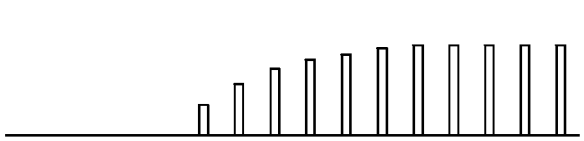
Figure 5:
Figure 5:
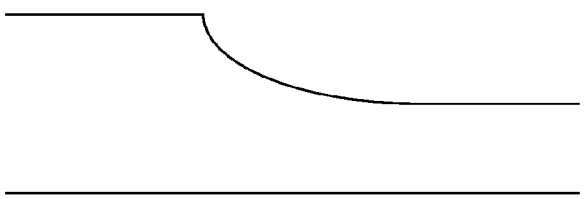
Figure 5:
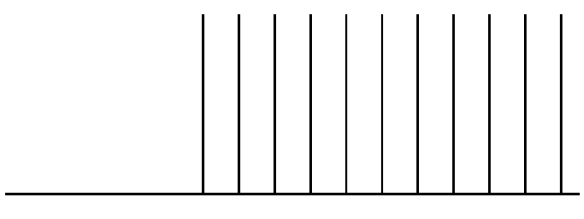

FIG. 4b illustrates a ramped switch transmission that would produce the seed pulse input shown in FIG. 4c from the continuous sequence of FIG. 4a. The convolution of the ramped pulses of FIG. 4c and the decreasing effective gain of FIG. 4d results in the uniform sequence of output pulses shown in FIG. 4e. Similarly, FIGS. 5a-5e depict a system in which the AOM both selects and attenuates the seed pulses prior to injection into the amplifier, with the same result, FIG. 5e, as illustrated in FIG. 4e.

Another implementation for keeping the pulse energy constant or controlled includes adjusting the amplifier pump current such that the gain is lower for the initial pulses and increasing the current and, thus, the amplifier gain for the following pulses. It may be further advantageous to decrease the diode pump current when the pulses are not desired for some time. Decreasing the diode pump current may be desirable if the time between pulses exceeds the fluorescent lifetime of the active ion in the gain amplifier. For times greater than 1 ms, it may be desirable to reduce the diode current.

Diode replacement is an important factor in the cost of operation of such a laser. Also, if the diodes are turned off completely the thermal distribution may change significantly enough to necessitate a short warm up period for the laser. However, it is not necessary to turn the diodes off completely to obtain an increase in diode lifetime.

The lifetime of the diodes with power often exponentially follow the inverse of the output power of the laser diode (see, e.g., Milton Ohring, *Reliability and Failure of Electronic Materials and Devices*, (Academic Pres, New York, 1998) p. 550-552). Thus, decreasing the output power by a factor of two increases the lifetime of the diode by the square of the higher power lifetime. Thus, the diode power is decreased once the repetition rate falls below a threshold repetition rate and the diode power is ramped up when pulses are again desired in a manner that keeps the energy in the first pulses similar to all the pulses in the pulse train. This feature can, for example, be enabled when the laser is operated at a constant fixed repetition rate. Under these circumstances, the diode power is typically ramped up before the pulse is desired, within a time period approximately equal to the fluorescent lifetime of the active ion, for example, on the order of 1 ms.

As described above it is often desired to control the pulse energy in a desired method for the particular application. However, it may also be necessary to control the pulse energy in order to protect the amplifier from damage. As described above the gain of the amplifier increases whenever the input stops. If the pulses are inadvertently stopped and then started at full power, optical damage to the amplifier is possible.

One purpose of the electronics is to prevent optical damage to the amplifier if the oscillator stops outputting mode-locked pulses or outputs a series of mode-locked, Q-switched pulses with even higher pulse energies. It is important to shut-down the amplifier before damage occurs. The controller also monitors the repetition rate of the oscillator. In one embodiment, a photodiode and amplifier converts the optical signal into an electrical pulse train. The controller then calculates the repetition rate of this electrical signal by measuring the time between pulses. If this rate varies from a preset value, such as the nominal oscillator repetition rate, by a predetermined amount, the current to the amplifier pump diode is reduced or shut off to prevent damage to the system and an error signal is generated.

An alternative or additional method of preventing damage is to disable the pulse selector or select high attenuation for the attenuator before the amplifier so no, or very low energy, seed pulses enter the amplifier. The allowable variation from the nominal value of the repetition rate can be adjusted and is stored in the controller for comparison.

In another embodiment of the invention, the repetition rate of this pulsed fiber system is synchronized to an external timing reference. In this case, it is necessary to prevent damage from loss of the timing signal and subsequent recovery of the signal. The time between trigger pulses is monitored to ensure that the repetition rate does not fall below a predetermined repetition rate. If the time between pulses is exceeded, the controller will generate an additional seed pulse, such that the energy of the amplifier can be extracted and damage to the amplifier will be prevented. This prevents the laser system from operating below a predetermined safe repetition rate.

In an embodiment of the invention discussed previously, the pulse source is a mode-locked fiber laser that runs at a fixed pulse width and repetition rate and the pulses to be injected into the amplifier are selected by controlling an external modulator, the rate of opening and closing being set by the controller, thus setting the repetition rate of the system. By this means the repetition rate needs to be a multiple of the repetition rate of the mode-locked laser. For example, if the repetition rate of the mode-locked laser is 50 MHz and 5 MHz is the desired rate, then the external modulator is opened up to let every $10^{th}$ pulse through. If every $11^{th}$ pulse is let through then the repetition rate is 4.54 MHz. However, if non-multiple repetition rate such as 4.8 MHz is desired, one way to obtain a repetition rate, on average, of 4.8 MHz is to alternately let every $10^{th}$ pulse through and then every $11^{th}$ pulse so that the average repetition rate is achieved.

Figure 6:
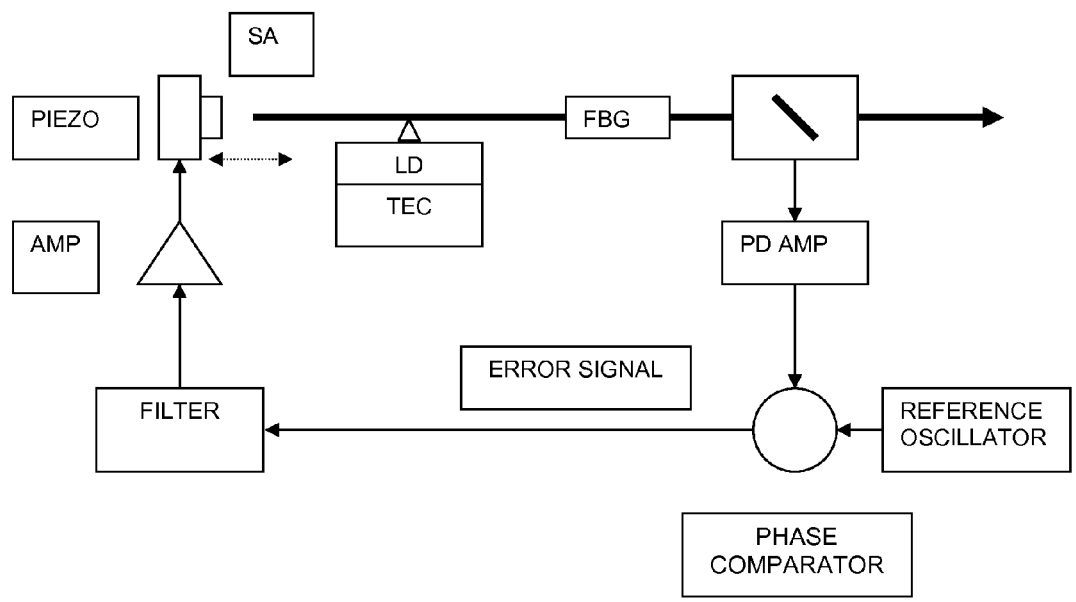
FIG. 6 illustrates a phase-locked loop in accordance with an embodiment of the present invention.

However, certain applications require that the pulses from the MOPA be synchronized to an external temporal signal. If the seed source can be externally triggered this is not difficult. However, if the seed source is a passively mode-locked laser then the repetition rate of the oscillator must be synchronized to the external reference signal. This is accomplished by mounting one of the end mirrors of the mode-locked laser's optical cavity on a movable element such as a piezoelectric transducer. An additional method of changing the repetition rate is to mount the fiber of the laser so that it may be stretched. For example, mounting the fiber on a Piezoelectric drum. The phase and frequency of the reference oscillator are then compared with the phase and frequency of the optical oscillator and the cavity length is adjusted such that the optical oscillator and the reference oscillator are locked in phase and frequency. The electronic circuitry used to accomplish the above-described construction is commonly referred to as a phase locked loop. This is shown in FIG. 6.

In certain applications it is desirable to change the repetition rate of the laser in a controlled fashion during laser operation. The above circuitry can also be used to vary the repetition rate of the optical oscillator, either by changing the repetition rate of the reference oscillator or by moving the end mirror of the optical cavity by controlling the piezoelectric transducer directly when it is not locked. In present applications, the cavity length is varied by 1% by moving the end mirror. Thus the repetition rate can be varied by 1%. At this point the pulse selector can be used to select a different number of pulses and the cavity length can be readjusted to get the same repetition rate. Continuous tuning is then obtainable down to 100 Hz in this manner.

In one embodiment of the invention, the pulse source is a semiconductor diode that is directly modulated by the controller at an amplitude, repetition rate and pulse width that is set by the operator. Based on the set amplitude, pulse width and repetition rate, the controller determines the optimum pump current for the amplifier pump diode. This value of the pump current may be calculated or stored in a lookup table in the controller for a range of repetition rates and pulse width values. Based on the optimum pump current, an optimum pump diode temperature is calculated, such that the pump diode wavelength will be optimized to the particular amplifier fiber characteristics. This optimum pump diode temperature depends on the diode characteristics and will vary from pump diode to pump diode. An initial calibration of each pump diode wavelength as a function of temperature and current is performed during system integration. These results are used by the controller to calculate the optimum temperature. The controller then applies these settings to the amplifier pump diode.

As shown in FIG. 7, additional optical and electrical parameters can be monitored and controlled. Control of these parameters can be incorporated into the laser controller or can be incorporated into a system controller that is external to the laser controller and specific to the particular application. The laser controller has the ability to communicate with an external system controller over a communications link using communication protocols common to computer communication, such as RS-232, TCP/IP, CAN etc. This has advantages in performing operations in various application areas as described briefly below.

In certain applications, such as micromachining, it is desirable to monitor and control parameters such as output polarization. This can be adjusted by electronically rotating a half waveplate, or by electronically controlling the voltage applied to a liquid crystal retarder. The output polarization ratio can be measured using a pair of sensors that monitor the reflected versus transmitted light of a polarizing beam splitter, such as a Glan/Thompson type or other polarizing discriminator means.

In other applications, also including micromachining, it is also desirable to monitor and control parameters such as beam shape. This can be controlled electronically by using a motorized optical subsystem such as a cylindrical beam-expanding telescope with three elements. Each telescope incorporates an input and output lens with variable separation between them that adjusts the magnification and a moveable intermediate lens that adjusts the beam divergence. Two such subsystems oriented orthogonally provide either uniform or astigmatic control of the beam size and shape. Additional beam control can be achieved by rotating one or both of the telescopes about the optical axis. This can be monitored electronically using a sensor such as a camera.

In further applications, it is desirable to synchronize the output of the laser to an external beam positioning system such as a galvanometer. This is accomplished by synchronizing the AOM in the down counter to the galvanometer. An external trigger input on the laser controller is used to synchronize the laser repetition rate and the opening of the AOM shutter with the trigger output of the positioning system using the methods described previously. This allows the laser in, for example, the micromachining system to vary the time between pulses to accommodate the differences in scan times of the positioning system.

In yet further applications, it is desirable to use the laser to perform a metrology or another measurement function as well as a micromachining function. This is accomplished in the laser system by changing the repetition rate and output power, by the means described previously, such that the laser outputs a low pulse energy, high repetition rate pulse train for use in metrology or for another measurement, and a high pulse energy pulse train at a lower repetition rate for micromachining. Ideally, the laser shutter is turned to constantly open and the output of the system is the same as the source for the measurement function. This function may also be implemented by using a portion of the oscillator pulse train directly, and in parallel, with the high energy pulse train. Specifically, the high repetition rate metrology could be used for measuring the depth of the material ablated utilizing the metrology means described in U.S. Pat. Nos. 5,489,984 and 5,585,913. Other exemplary measurement functions are two-photon microscopy and Optical Coherent Tomography (OCT). Such functions would be particularly useful in surgical procedures where OCT or two-photon microscopy is utilized to image diseased tissue. In accordance with these exemplary applications, the laser is operated at a lower repetition rate where material ablation occurs to remove the diseased tissue and then OCT or two-photon microscopy is used to assure all the desired tissue is removed.

What is claimed is:

1. A high power fiber amplifier system comprising:
   a passively mode locked oscillator generating optical pulses at a repetition rate;

a fiber amplifier disposed downstream from said oscillator and arranged to receive at least a portion of said optical pulses from said oscillator;

a controller operatively coupled to at least said oscillator, said controller comprising an element for monitoring a repetition rate of said oscillator, said element comprising a photodetector to receive and convert a fraction of the optical power of said optical pulses from said oscillator into electrical signals representative of said repetition rate, said controller capable of determining said repetition rate from said electrical signals and calculating a required down counter divide ratio needed to obtain a desired lower repetition rate, and a reference oscillator that generates a reference signal; and a means for synchronizing said passively mode locked oscillator with the reference signal, wherein pulses with a desired repetition rate are output from the high power amplifier system notwithstanding variations in the oscillator repetition rate as a function of time or temperature.

2. A high power fiber amplifier system as claimed in claim 1,
wherein a repetition rate of the oscillator varies in accordance with the reference signal.

3. The high power fiber amplifier system as claimed in claim 1, wherein a cavity of the passively mode locked oscillator comprises a doped gain fiber, and said cavity further comprises a fiber Bragg grating, said fiber Bragg grating coupled to said controller and a temperature control device to wavelength tune said passively mode locked oscillator.

4. The high power fiber amplifier system as claimed in claim 1, wherein a fiber Bragg grating is disposed in said oscillator, and wherein a wavelength of the oscillator is controllable by controlling the temperature of said fiber Bragg grating.

5. The high power fiber amplifier system as claimed in claim 1, wherein a fiber Bragg grating is disposed in said oscillator, and wherein a wavelength of the oscillator is controllable with mechanical tension applied to the grating with a piezoelectric device.

6. The high power fiber amplifier system as claimed in claim 1, wherein a fiber Bragg grating is disposed in said oscillator, and wherein a wavelength of the oscillator is controllable by applying mechanical stress on said fiber Bragg grating.

7. power fiber amplifier system as claimed in claim 1, wherein a fiber Bragg grating is disposed in said oscillator, and said system comprises one or more elements for controlling a wavelength of said oscillator to sub-nanometer accuracy with control of said fiber Bragg grating.

8. The high power fiber amplifier system as claimed in claim 1, wherein said means for synchronizing comprises: a piezoelectric transducer; and a cavity end mirror of said passively mode locked oscillator coupled to said piezoelectric transducer, said piezoelectric transducer being in communication with said controller and arranged to vary the repetition rate of said passively mode locked oscillator by adjusting said cavity end mirror position with said piezoelectric transducer.

9. The high power fiber amplifier system as claimed in claim 1, wherein said passively mode locked oscillator comprises optical fiber, and said means for synchronizing comprises a portion of said optical fiber mounted on a piezoelectric drum to stretch said fiber and to vary the repetition rate of said passively mode locked fiber oscillator.

10. The high power fiber amplifier system as claimed in claim 1, wherein said element for monitoring a repetition rate of said oscillator is capable of detecting gain buildup in excess of the damage threshold of said fiber amplifier by monitoring the repetition rate of the injected oscillator pulses or an external signal, and shutting off or reducing an amplifier pump signal if the repetition rate falls below a predetermined threshold, thereby protecting the high power fiber amplifier system from damage.

11. The high power fiber amplifier system as claimed in claim 1, wherein said high power amplifier system comprises a detector operatively connected to said controller to monitor an amplitude of a seed pulse injected into said fiber amplifier and to shut off the pump diode if the amplitude of the injected pulse falls outside a predetermined range, thereby protecting the high power fiber amplifier from damage.

12. The high power fiber amplifier system as claimed in claim 1, wherein said oscillator and amplifier are each diode pumped, and said controller is arranged to control an electric current of a pump diode and further control a gain of a fiber amplifier, wherein during operation of the system, an output pulse energy is controllable to be constant as one or both of a pulse width or repetition rate of the high power amplifier system are adjusted.

13. The high power fiber amplifier system as claimed in claim 12, wherein said controller is arranged to control an electric current of said pump diode and further controls a gain of said fiber amplifier, wherein during operation of the system, an output pulse energy is controlled to be constant as a pulse width and repetition rate of system output pulses are adjusted.

14. The high power fiber amplifier system as claimed in claim 1, wherein said high power fiber amplifier system comprises a polarization monitor and polarization controller comprising one of more of a rotatable half wave plate or a liquid crystal retarder and optical elements for polarization discrimination.

15. The high power fiber amplifier system as claimed in claim 1, wherein said high power fiber amplifier system comprises a beam shape monitor and controller comprising an optical sensor with which a beam shape is determined; and a motorized optical sub-system to control beam shape.

16. The high power fiber amplifier system as claimed in claim 1, wherein said passively modelocked oscillator comprises a saturable absorber; and a thermoelectric cooler to control temperature of said saturable absorber, said saturable absorber and said thermoelectric cooler being operatively connected to said controller.

17. The high power fiber amplifier system as claimed in claim 1, wherein said passively modelocked oscillator comprises a semiconductor saturable absorber, wherein the wavelength of the oscillator is controllable by varying the temperature of said semiconductor saturable absorber, said semiconductor saturable absorber being operatively connected to said controller.

18. The high power fiber amplifier system as claimed in claim 1, further comprising: an attenuating device operable to receive and attenuate the pulses from said passively mode locked oscillator prior amplification of said pulses with said fiber amplifier, wherein said controller is operatively connected to said attenuating device and configured in such a way that the amplified pulses have a uniform energy as one or both of a repetition rate and an amplitude of the seed pulses is varied.

19. The high power fiber amplifier system as claimed in claim 18, wherein the attenuating device is arranged to provide a down-counting function.

20. The high power fiber amplifier system as claimed in claim 18, wherein said passively modelocked oscillator comprises an attenuator different than said attenuating device.

21. The high power fiber amplifier system as claimed in claim 18, wherein attenuated pulses output from said pulse attenuator have progressively increasing amplitudes.

22. The high power fiber amplifier system as claimed in claim 1, wherein, subsequent to an interval during which laser pulses are not provided, said controller adjusts pump current supplied to said fiber amplifier to lower amplifier gain for an initial set of pulses followed by increasing gain for subsequent pulse(s).

23. The high power fiber amplifier system as claimed in claim 1, wherein said system comprises a wavelength locker having an etalon and photodetector disposed therein, said wavelength locker operatively connected to said passively mode locked oscillator and said controller, wherein said wavelength locker monitors the output of said passively mode locked oscillator based on a transfer function of an etalon and wherein transmission of the etalon is measured and a photocurrent of the etalon transmission is compared with a photocurrent from a reference detector to determine a wavelength shift.

24. The high power fiber amplifier system as claimed in claim 1, wherein said system is arranged for communication with an external system via a computer communication protocol, and arranged for monitoring and control of optical and electronic parameters of said high power amplifier system.

25. The high power fiber amplifier system as claimed in claim 1, wherein said high power fiber amplifier system is arranged in a system for metrology or a system for micromachining.

26. The high power fiber amplifier system as claimed in claim 1, wherein said high power fiber amplifier system is arranged in a system for optical coherence tomography (OCT) or a system for two-photon microscopy.

27. The high power fiber amplifier system as claimed in claim 1, wherein said controller is operatively connected to each of said passively mode locked oscillator and said fiber amplifier.

28. The high power fiber amplifier system as claimed in claim 1, wherein said means for synchronizing comprises a phase locked loop.

* * * * *